United States Patent
Heck

(10) Patent No.: US 11,346,406 B2
(45) Date of Patent: May 31, 2022

(54) CENTRIFUGAL CLUTCH HAVING CENTRIFUGAL MASSES WHICH ARE MANUFACTURED WITHOUT CUTTING

(71) Applicant: Schaeffler Technologies AG & Co. KG

(72) Inventor: Roman Heck, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/618,434

(22) PCT Filed: May 30, 2018

(86) PCT No.: PCT/DE2018/100526
§ 371 (c)(1),
(2) Date: Dec. 2, 2019

(87) PCT Pub. No.: WO2018/233758
PCT Pub. Date: Dec. 27, 2018

(65) Prior Publication Data
US 2020/0096060 A1 Mar. 26, 2020

(30) Foreign Application Priority Data
Jun. 19, 2017 (DE) .................. 102017113349.6

(51) Int. Cl.
*F16D 43/14* (2006.01)
*F16D 43/10* (2006.01)
*F16D 13/52* (2006.01)

(52) U.S. Cl.
CPC ............. *F16D 43/10* (2013.01); *F16D 13/52* (2013.01); *F16D 2250/0023* (2013.01); *F16D 2250/0084* (2013.01)

(58) Field of Classification Search
CPC ..... F16D 43/14; F16D 43/18; F16D 43/06–12
See application file for complete search history.

(56) References Cited

U.S. PATENT DOCUMENTS 1,161,423 A 11/1915 Swanda
1,552,012 A 9/1925 Searcy
(Continued)

FOREIGN PATENT DOCUMENTS

CN 1930403 A 3/2007
CN 204900602 U 12/2015
(Continued)

OTHER PUBLICATIONS

International Search Report for Corresponding PCT/DE2018/100526.

*Primary Examiner* — Ernesto A Suarez
*Assistant Examiner* — Lillian T Nguyen
(74) *Attorney, Agent, or Firm* — Davidson, Davidson & Kappel, LLC

(57) ABSTRACT

A centrifugal clutch (1) for a drive train of a motor vehicle, has an input component (2) which serves for the introduction of torque, an output component (3) which serves for the discharge of torque. The clutch includes an engine-side centrifugal mass (5) and a transmission-side centrifugal mass (6) for actuating the friction unit (4), which centrifugal masses (5; 6) are operatively connected to an engine-side and transmission-side bent sheet metal piece (7, 8). At least one of the centrifugal masses (5; 6) has a cut-out (9) which is such that at least one device (10) which is fixed to the input component has an arm (11) which engages into the cut-out (9) in such a way that guidance of the radial displacement of at least one of the centrifugal masses (5; 6) is ensured.

20 Claims, 2 Drawing Sheets

(56) References Cited

U.S. PATENT DOCUMENTS

| | | | |
|---|---|---|---|
| 4,328,877 A | 5/1982 | Ballard | |
| 5,070,984 A * | 12/1991 | Fehring | F16D 43/10 |
| | | | 192/105 B |
| 6,309,317 B1 * | 10/2001 | Joss | F16D 43/06 |
| | | | 474/13 |
| 7,137,498 B2 | 11/2006 | Gochenour et al. | |
| 7,367,440 B2 | 5/2008 | Abusamra et al. | |
| 2007/0125617 A1 * | 6/2007 | Gochenour | F16D 13/752 |
| | | | 192/105 C |
| 2009/0000898 A1 * | 1/2009 | Inomori | F16D 43/12 |
| | | | 192/70.11 |
| 2019/0048946 A1 | 2/2019 | Heuberger et al. | |
| 2019/0128344 A1 | 5/2019 | Heuberger | |
| 2019/0277352 A1 * | 9/2019 | Heuberger | F16D 21/00 |

FOREIGN PATENT DOCUMENTS

| | | | |
|---|---|---|---|
| CN | 105240423 A | 1/2016 | |
| CN | 106104054 A | 11/2016 | |
| DE | 202015003993 U1 * | 8/2015 | F16D 43/18 |
| DE | 102016204111 | 9/2017 | |
| DE | 102016211217 B3 | 12/2017 | |
| DE | 102017103108 | 8/2018 | |
| DE | 102017103190 | 8/2018 | |

\* cited by examiner

CENTRIFUGAL CLUTCH HAVING CENTRIFUGAL MASSES WHICH ARE MANUFACTURED WITHOUT CUTTING

The present disclosure relates to a centrifugal clutch for a drivetrain of a motor vehicle, for example of a motorcycle, of a light motorcycle or of a scooter, having an input component, such as for example a primary gear or a toothed gear, which serves for the introduction of torque, an output component, such as for example a shaft, which serves for the onward transfer of torque, and a switchable friction unit, which is arranged between the input component and the output component and which connects the input component to the output component in torque-transmitting fashion by frictional engagement, wherein, for the actuation of the friction unit, an engine-side centrifugal mass and a transmission-side centrifugal mass are provided, which are in operative contact with an engine-side and a transmission-side angled plate respectively such that a radial displacement of at least one of the centrifugal masses forces/effects an axial displacement of the respective/corresponding angled plate.

Centrifugal clutches serve, in drivetrains of said type, for equalizing a drive rotational speed and a transmission rotational speed, in particular during launch processes of the motor vehicle. Here, the engine-side centrifugal masses facilitate the launch, and the transmission-side centrifugal masses facilitate the reliable frictional engagement of the clutch. By means of the dual centrifugal system, the rotational speed characteristic map generated by the engine is utilized to the maximum extent, and fuel consumption is reduced.

BACKGROUND

Centrifugal clutches, which are also referred to as semiautomatic motorcycle clutches or semiautomatic clutches, are already widely known from the prior art. For example, DE 10 2017 103 108 A1 discloses a centrifugal clutch for a drivetrain of a motor vehicle, having an input part, an output part which is arranged coaxially and rotatably relative to the input part, and a friction unit which is switchable in a manner dependent on a centrifugal force, wherein the friction unit comprises first friction elements rotationally conjointly connected to the input part and second friction elements rotationally conjointly connected to the output part, which first friction elements and second friction elements are arranged in layered fashion so as to alternate in an axial direction and, in order to close the centrifugal clutch, can be placed in frictional engagement by means of at least one switching device which switches in a manner dependent on a centrifugal force, wherein the at least one switching device which switches in a manner dependent on a centrifugal force comprises at least one centrifugal mass which is movable from an open position into a closed position by a centrifugal force that arises in the event of a rotation of the at least one switching device which switches in a manner dependent on centrifugal force, wherein the at least one centrifugal mass, during its movement from the open position into the closed position, is acted on in a first movement range by at least one braking spring with a first braking force counter to the movement direction of the at least one centrifugal mass and is acted on in a second movement range by the at least one braking spring with a second braking force counter to the movement direction of the at least one centrifugal mass, and wherein the first braking force is greater than the second braking force.

DE 10 2017 103 190 A1 discloses a centrifugal clutch having an input part, an output part which is arranged coaxially and rotatably relative to the input part, and a friction unit which is switchable in a manner dependent on a centrifugal force between the input part and the output part, wherein the friction unit comprises first friction elements, which are connected rotationally conjointly to the input part, and second friction elements, which are connected rotationally conjointly to a leaf spring core of the output part, which first friction elements and second friction elements are arranged in layered fashion so as to alternate in an axial direction and, in order to close the centrifugal clutch, can be placed in frictional engagement, and braced against a counter pressure plate, by means of at least one switching device which switches in a manner dependent on a centrifugal force, wherein the leaf spring core has at least one fastening element which extends through the counter pressure plate and to which the counter pressure plate is fastened by means of a circlip.

DE 10 2016 204 111 A1 has disclosed a friction clutch for a drivetrain of a motor vehicle, having an engine-side input part, which is arranged so as to be rotatable about an axis of rotation, and a transmission-side output part, which is connectable in frictionally engaging fashion to said input part by means of friction partners with formation of frictional engagement, wherein the friction partners are designed such that they can be braced axially against one another by means of at least one centrifugal-force-controlled actuating device. In order, in a moving motor vehicle, to be able to transmit torque via the friction clutch in the presence of low rotational speeds of the drive engine, an engine-side actuating device is provided between the input part and the friction partners, and a transmission-side actuating device is provided between the output part and the friction partners.

DE 10 2016 211 217 B3 has disclosed a centrifugal clutch which has a centrifugal mass, which is coupled to an angled plate such that a radial movement of the centrifugal mass caused by a centrifugal force gives rise to an axial movement of the angled plate, and a preloading element, which is assigned to a coupling bolt, wherein the coupling bolt is configured to transmit the axial movement of the angled plate at least partially to an inner cage designed for holding disks, wherein the coupling bolt engages in a slot of the angled plate such that, in an intermediate operational position, a relative movement between the angled plate and the coupling bolt in the event of a rotation of the inner cage relative to the angled plate is made possible, wherein, in the intermediate operational position, a loading portion, provided for the onward transmission of force to the preloading element, of the angled plate, a stop which is fixed to the coupling bolt and a stop which is fixed to the preloading element are coordinated with one another such that the angled plate, at the loading portion, has a contact region for the onward transmission of force at most on one side.

Commonly, in the known centrifugal clutches, the engine-side centrifugal masses are guided in a centered manner under centrifugal force with the aid of pins in a groove in the primary gear. As a result of the radial displacement under centrifugal force, the centrifugal weights or centrifugal masses move an angled plate, by way of ramps, in an axial direction until the disk assembly is compressed and the transmission is synchronized. When the transmission has been synchronized, the transmission-side centrifugal masses are accelerated. The transmission-side centrifugal masses are guided by the construction in the same way as the engine-side centrifugal masses. By contrast to the engine-side centrifugal masses, the transmission-side centrifugal masses have a higher weight in order to realize the required pressing force. Thus, in the event of an increase of the rotational speed, the clutch is closed by the centrifugal masses.

Another possibility for guidance of the centrifugal masses consists in designing the outer disk carrier or the guide plate such that the masses are moved in a guided manner thereon. However, both possibilities lead to severe disadvantages: in the case of the guidance by means of the centering pins, a total of 12 cylindrical pins are required, which entails increased assembly effort and additional costs. Furthermore, the primary gear must be cut, because the tolerance situation is very narrow in order to be able to generate the guide path for the cylindrical pins, and must furthermore subsequently undergo heat treatment, giving rise to further costs in the machining process. The second possibility for guidance requires additional cutting of the masses, which likewise results in additional costs.

SUMMARY

It is an object of the present disclosure to avoid or at least alleviate the disadvantages from the prior art, and in particular to provide a possibility for guiding the centrifugal masses in the clutch such that the assembly process is simplified and the costs for the individual parts and the machining process are reduced.

A centrifugal clutch is provided in which at least one of the centrifugal masses has an aperture such that at least one device, such as for example the primary gear or an outer disk carrier, which is fixed to the input component has an arm which engages into the aperture such that guidance of the radial displacement, forced by centrifugal force, of at least one of the centrifugal masses is achieved/ensured/forcibly predefined.

It is advantageous if, both at the engine side and at the transmission side, multiple centrifugal masses, for example two, three or four, are arranged so as to be distributed over the circumference. It is preferable for three centrifugal masses to be provided both at the engine side and at the transmission side. By means of the even distribution over the circumference, it is ensured that no imbalance is generated as a result of the radial displacement of the centrifugal masses (as a result of action of the centrifugal force).

It is furthermore advantageous if the aperture is formed as a guide groove, which is preferably open at a radially outer end. Corresponding devices fixed to the input component can engage into the guide groove in order to firstly guide the centrifugal mass and secondly restrict the latter in terms of its radial displacement.

In order to reduce costs, it has proven advantageous if the centrifugal masses are formed as components which are forged, punched, stamped or similarly manufactured by non-cutting methods. The non-cutting manufacturing of the centrifugal masses permits a considerable saving of costs in relation to the cutting production processes.

It is furthermore advantageous if the centrifugal mass has a stamped slope at preferably a radially inner end of the aperture. Said slope effects the axial displacement of the angled plate in the event of radial displacement of the centrifugal mass.

One possible advantageous embodiment provides for the device fixed to the input component to be formed as an outer disk carrier or as a holding plate. For the guidance of the centrifugal mass, it has proven advantageous if the arm is formed by deformation. Deformation is an inexpensive production method, whereby costs can be saved.

It is furthermore advantageous if the stamped slope forms an angle greater than 0° and less than 90°, preferably of approximately 45°, with respect to a horizontal plane. By means of a steep slope, it can be ensured that undesired self-locking, and thus a disruption of the functioning of the centrifugal clutch, do not occur.

It is furthermore advantageous if the at least one engine-side centrifugal mass is connected rotationally conjointly to the input component.

For the actuation of the friction unit, it has proven advantageous if the angled plates have at least one slope which is geometrically adapted to the stamped slope of the centrifugal mass such that these bear against one another in an operational state.

In other words, the centrifugal masses may be designed such that they can be produced simply by punching and stamping. The new guidance is realized by means of the holding plate or the outer disk carrier. Here, a guide groove and a stamped slope are formed for the axial displacement of the angled plate. Thus, additional machining of the centrifugal masses is no longer necessary. In association with this change, the angled plates must be correspondingly redesigned. The holding plate or the outer disk carrier are constructed with deformed arms, such that these serve as a guide and simultaneously as a stop of the centrifugal masses.

A centrifugal clutch or a semiautomatic multi-disk clutch, in particular for scooters, is provided in the case of which the guidance of the centrifugal masses is realized by means of the holding plate or the outer disk carrier. Here, the centrifugal masses each have a guide groove and a stamped slope.

BRIEF SUMMARY OF THE DRAWINGS

The the present disclosure will be discussed in more detail below with the aid of figures, which illustrate one possible embodiment by way of example. In the figures.

DETAILED DESCRIPTION

The figures are merely of a schematic nature and serve only for the understanding of the invention. The same elements are denoted by the same reference designations.

Figure 1:
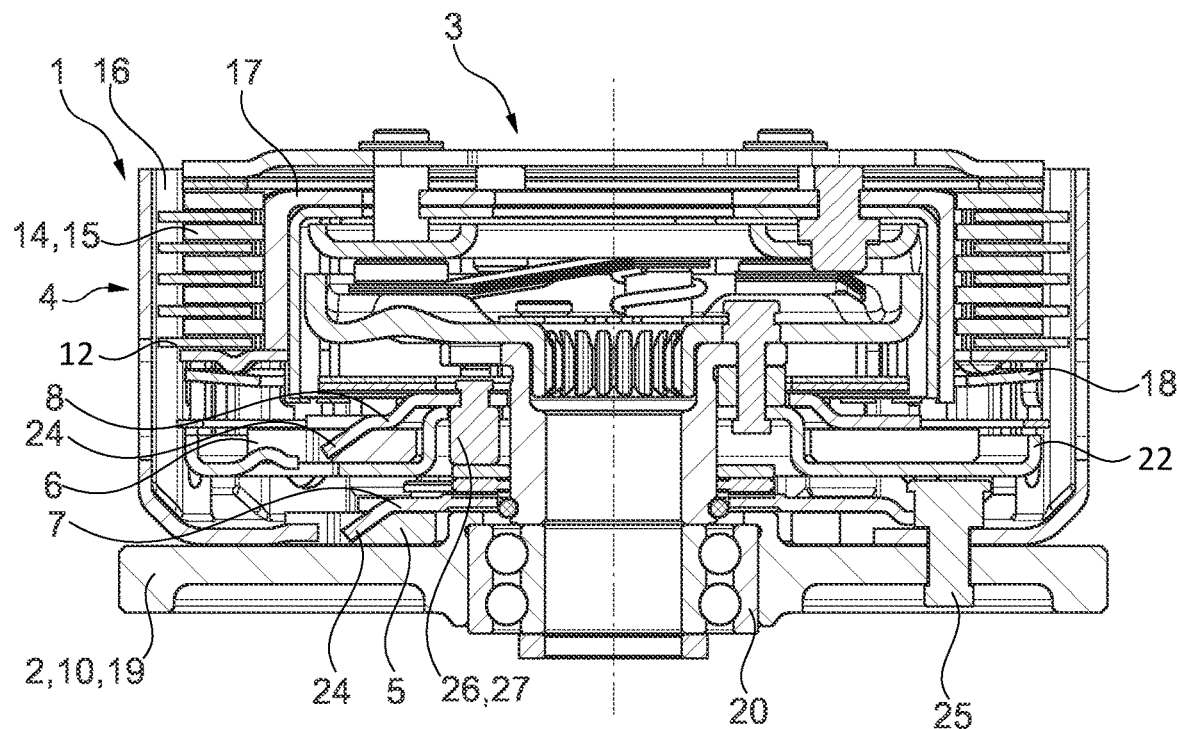
FIG. 1 shows a longitudinal sectional view of a centrifugal clutch.

FIG. 1 shows a longitudinal sectional view of a centrifugal clutch 1, such as is used for example in a drivetrain of a motor vehicle, such as a motorcycle or the like. The centrifugal clutch 1 has an input component 2 for the introduction of torque that is transmitted from an engine, and has an output component 3 for the onward transfer of torque or transmission of torque to a transmission. Formed between the input component 2 and the output component 3 is a switchable friction unit 4, by means of which the torque that is introduced via the input component 2 is transmitted by frictional engagement to the output component 3 and thus to the transmission. The centrifugal clutch 1 can thus also be referred to as multi-disk clutch.

Figure 2:
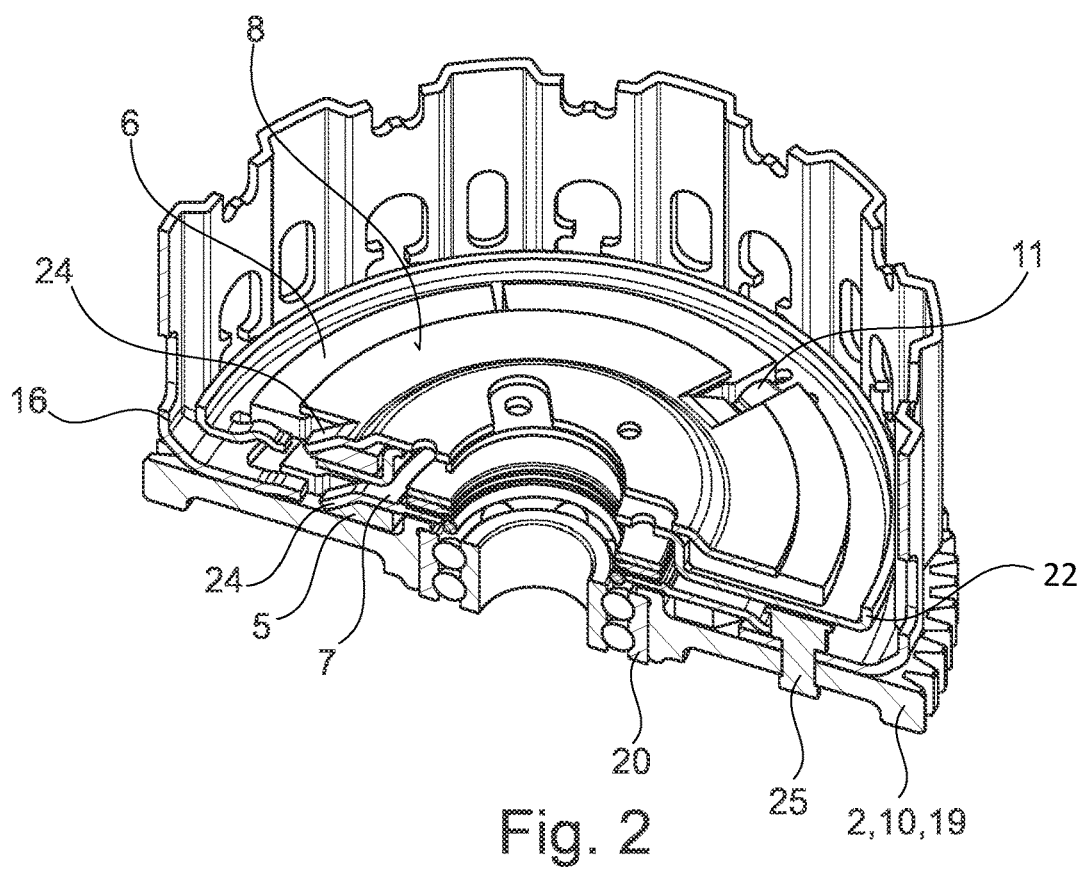
FIG. 2 shows a longitudinal sectional view, illustrated in simplified form, of the centrifugal clutch illustrated in FIG. 1, in a perspective illustration.

For the actuation of the friction unit 4, the centrifugal clutch 1 furthermore has an engine-side centrifugal mass 5 and a transmission-side centrifugal mass 6, which are in each case in operative contact with an engine-side and a transmission-side angled plate 7, 8 respectively. In order to guide the centrifugal mass 5 or 6 and restrict the movement thereof, the respective centrifugal mass 5, 6 has an aperture 9 (see FIG. 3) into which a device 10 fixed to the input component engages by means of an arm 11 (see FIG. 2) in order to guide the centrifugal mass 5, 6 and restrict the radial displacement.

The friction unit 4 comprises first friction elements 12, which are formed for example as steel disks, and second friction elements 14, which are formed for example as friction disks 15, which first and second friction elements are arranged so as to alternate in an axial direction. Here, the first friction elements 12 are arranged on an outer disk carrier 16, whereas the second friction elements 14 are arranged on an inner disk carrier 17. The outer disk carrier 16 and the inner disk carrier 17 are arranged coaxially with respect to one another, such that the inner disk carrier 17 is arranged radially within the outer disk carrier 16.

In a centrifugal clutch 1 of said type, the frictional engagement of the friction unit 4 is effected by virtue of the first friction elements 12 and the second friction elements 14 being pressed/braced against one another by action of centrifugal force such that frictional engagement is generated between said friction elements 12, 14, and thus a torque is transmitted from the input component 2 to the output component 3.

For this purpose, the centrifugal masses 5, 6 are displaced radially in a manner dependent on a centrifugal force, which leads to an axial displacement of the angled plates 7, 8 owing to the interaction between the centrifugal mass 5 or 6 and the angled plate 7 or 8 respectively. This axial displacement of the angled plate or of the angled plates 7, 8 has the effect that an axially displaceable disk part 18 is displaced axially in the direction of the friction unit 4 such that, in the presence of sufficient action of centrifugal force, frictional engagement is generated.

The input component 2 is formed here as a primary gear 19, which is connected in torque-transmitting fashion to an engine. The output component 3 transmits the torque, which is transmitted via the friction unit 4 from the input component 2, via a shaft to a transmission. The shaft is arranged coaxially with respect to the input component 2 and the output component 3 and, in the embodiment shown here, is supported in the primary gear 19 by means of a rolling bearing 20 such that the shaft (not shown) and the primary gear 19 can rotate independently of one another (see FIG. 1).

Figure 3:
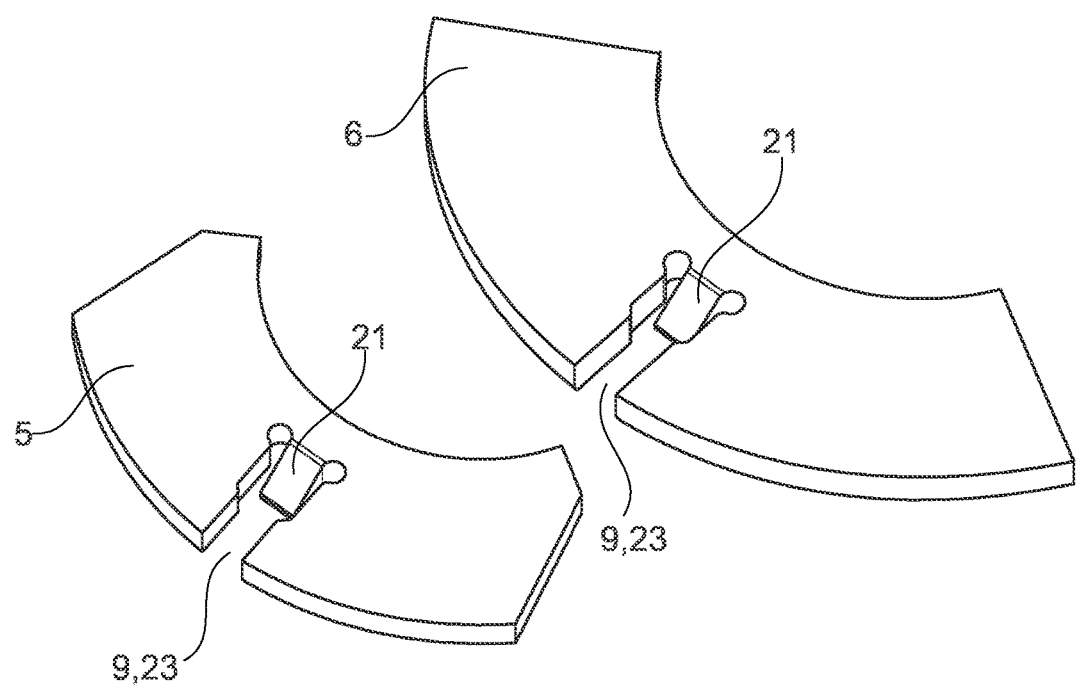
FIG. 3 shows a perspective view of an engine-side centrifugal mass and of a transmission-side centrifugal mass.

FIG. 3 shows the centrifugal masses 5 and 6 in a perspective view. In the exemplary embodiment shown here, in each case three centrifugal masses are provided both at the engine side and at the transmission side, as a result of which the shape of a centrifugal mass 5, 6 corresponds in a circumferential direction to one third of a complete circle. It can be seen that the engine-side centrifugal mass 5 is smaller than the transmission-side centrifugal mass 6. This means that the transmission-side centrifugal mass 6 has a higher mass than the engine-side centrifugal mass 5.

The centrifugal mass 5 or 6 is punched and stamped and has a radially running aperture 9, at the radially inner end of which a slope 21 is formed in the manner of a ramp, which is likewise produced by stamping. Said aperture 9 is engaged into by in each case one arm 11 of the device 10 fixed to the input component, which device, in the embodiment shown here, corresponds, at the engine side, to the outer disk carrier 16 (see FIG. 4) and, at the transmission side, to a holding plate 22 (see FIG. 5). The holding plate 22 is connected to the output component 3. As a result of the engagement of the arms 11 into the respective aperture 9, the centrifugal masses 5, 6 are both guided and restricted in terms of their radial displacement owing to an action of centrifugal force. The aperture 9 can thus also be referred to as a guide groove 23.

The angled plate 7 or 8 is formed as a disk-shaped or plate-shaped component which has fingers 24 which are sloped or inclined in a radial direction. The fingers 24 are in this case geometrically adapted to the slope 21 of the respective centrifugal mass 5, 6 such that these bear against one another (see FIG. 2) in an operational state of the centrifugal clutch 1 (in this case in the decoupled state).

Figure 4:
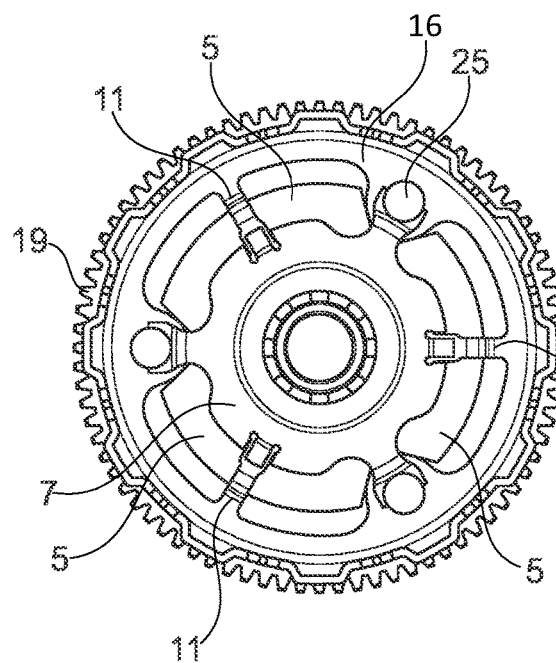
FIG. 4 shows a plan view of a primary gear with assembled engine-side centrifugal mass and engine-side angled plate.

As shown in FIG. 4, the engine-side angled plate 7 is fixed radially and rotationally conjointly to the primary gear 19 by means of three centering bolts 25 distributed evenly over the circumference. It can be seen in FIG. 1 that the centering bolt 25 however permits a displacement of the angled plate 7 in an axial direction.

Figure 5:
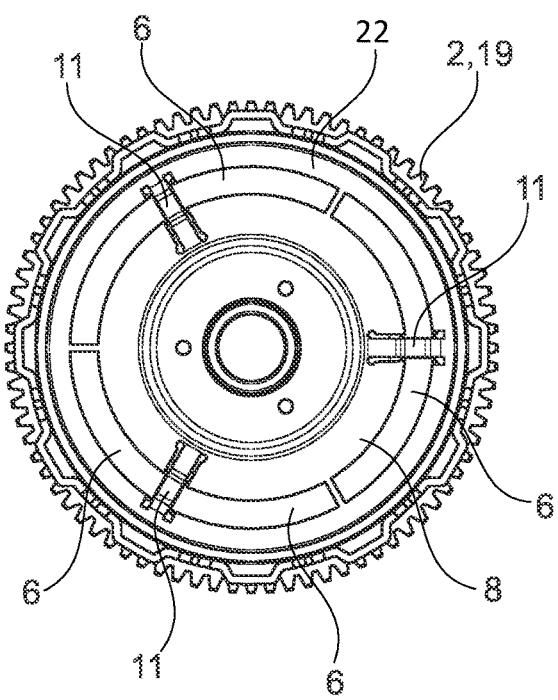
FIG. 5 shows a plan view of the primary gear with assembled transmission-side centrifugal mass and transmission-side angled plate.

FIG. 5 shows the transmission-side centrifugal mass 6 and the transmission-side angled plate 8 in the assembled state. The transmission-side centrifugal masses 6 are guided by means of the arms 11 of the holding plate 22, which is likewise connected, by means of a rivet bolt 26, to the primary gear 19. The transmission-side angled plate 8 likewise has fingers 24 which slope in a radial direction and which likewise, as already described in FIG. 4, lie on the slope 21 of the transmission-side centrifugal mass 6 in an operational state of the centrifugal clutch 1. The transmission-side angled plate 8 is centered by means of a centering bolt 27 which, like the centering bolt 25, permits a displacement of the angled plate 8 in an axial direction.

By means of such a construction of the centrifugal clutch 1, the manufacturing tolerances no longer have to be configured to be so narrow, as a result of which the centrifugal masses 5 and 6 are produced by means of inexpensive methods such as punching and stamping or else forging or some other non-cutting manufacturing method. The primary gear 19 as input component 2 can also be produced with lower accuracy without disadvantages arising during operation. The arms 11 of the outer disk carrier 16 or of the holding plate 22 can be produced by deformation, whereby the costs for producing the outer disk carrier 16 or the holding plate 22 are also reduced. All in all, the exemplary embodiment of the centrifugal clutch 1 shown by way of example here is a variant which is less expensive than centrifugal clutches known from the prior art, and which also requires less assembly effort.

LIST OF REFERENCE DESIGNATIONS

1 Centrifugal clutch
2 Input component
3 Output component
4 Friction unit
5 Engine-side centrifugal mass
6 Transmission-side centrifugal mass
7 Engine-side angled plate
8 Transmission-side angled plate
9 Aperture/recess
10 Device fixed to input component
11 Arm
12 First friction element
13 Steel disk 14 Second friction element
15 Friction disk
16 Outer disk carrier
17 Inner disk carrier
18 Disk part
19 Primary gear
20 Rolling bearing
21 Slope
22 Holding plate
23 Guide groove
24 Finger
25 Centering bolt
26 Rivet bolt
27 Centering bolt

What is claimed is:

1. A centrifugal clutch for a drivetrain of a motor vehicle comprising:
   an input component for an introduction of torque;
   an output component for an onward transfer of torque;
   a switchable friction unit arranged between the input component and the output component, the switchable friction unit connecting the input component to the output component in torque-transmitting fashion by frictional engagement; and
   an engine-side centrifugal mass and a transmission-side centrifugal mass configured for actuating the switchable friction unit, the engine-side centrifugal mass being in operative contact with an engine-side angled plate and the transmission-side centrifugal mass being in operative contact with a transmission-side angled plate such that a radial displacement of at least one of the engine-side and the transmission side centrifugal masses forces an axial displacement of the respective engine-side and/or transmission-side angled plate, at least one of the engine-side and the transmission side centrifugal masses having an aperture such that at least one device fixed to the input component has an arm which engages into the aperture to guide the radial displacement of at least one of the engine-side and the transmission side centrifugal masses.

2. The centrifugal clutch as claimed in claim 1, further comprising further engine-side centrifugal masses arranged with the engine-side centrifugal mass along a circumference and further transmission-side centrifugal masses arranged with the transmission-side centrifugal mass along a circumference.

3. The centrifugal clutch as claimed in claim 1, wherein the aperture is formed as a guide groove.

4. The centrifugal clutch as claimed in claim 1, wherein the engine-side and transmission side centrifugal masses are formed as components which are manufactured by non-cutting methods.

5. The centrifugal clutch as claimed in claim 1, wherein the non-cutting method include forging, punching or stamping.

6. The centrifugal clutch as claimed in claim 1, wherein the at least one of the engine-side and the transmission side centrifugal masses having the aperture has a stamped slope.

7. The centrifugal clutch as claimed in claim 1, wherein at least one of the engine-side and transmission-side angled plates have a slope which is geometrically adapted to the stamped slope such that the slope and the stamped slope bear against one another in an operational state.

8. The centrifugal clutch as claimed in claim 1, wherein the stamped slope forms an angle greater than 0° and less than 90° with respect to a horizontal plane.

9. The centrifugal clutch as claimed in claim 1, wherein the at least one device fixed to the input component is an outer disk carrier or a holding plate.

10. The centrifugal clutch as claimed in claim 1, wherein the arm is formed by deformation.

11. The centrifugal clutch as claimed in claim 1, wherein the engine-side centrifugal mass is connected rotationally conjointly to the input component.

12. A method of constructing a centrifugal clutch for a drivetrain of a motor vehicle comprising:
    providing an input component for an introduction of torque;
    providing an output component for an onward transfer of torque;
    arranging a switchable friction unit between the input component and the output component, the switchable friction unit connecting the input component to the output component in torque-transmitting fashion by frictional engagement; and
    providing at least one of:
      an engine-side centrifugal mass for actuating the switchable friction unit, the engine-side centrifugal mass being in operative contact with an engine-side angled plate such that a radial displacement of the engine-side centrifugal mass forces an axial displacement of the engine-side angled plate, the engine-side centrifugal mass has an aperture such that at least one device fixed to the input component has an arm which engages into the aperture to restrict the radially outward displacement of the engine-side centrifugal mass, and
      a transmission-side centrifugal mass configured for actuating the switchable friction unit, the transmission-side centrifugal mass being in operative contact with a transmission-side angled plate such that a radial displacement of the transmission side centrifugal mass forces an axial displacement of the transmission-side angled plate, the transmission side centrifugal mass having an aperture such that at least one device fixed to the input component has an arm which engages into the aperture to restrict the radially outward displacement of the transmission-side centrifugal mass.

13. The method as claimed in claim 12, wherein the method includes providing both of:
    the engine-side centrifugal mass for actuating the switchable friction unit, the engine-side centrifugal mass being in operative contact with the engine-side angled plate such that the radial displacement of the engine-side centrifugal mass forces the axial displacement of the engine-side angled plate, the engine-side centrifugal mass has the aperture such that at least one device fixed to the input component has the arm which engages into the aperture to guide the radial displacement of the engine-side centrifugal mass, and
    the transmission-side centrifugal mass configured for actuating the switchable friction unit, the transmission-side centrifugal mass being in operative contact with the transmission-side angled plate such that the radial displacement of the transmission side centrifugal mass forces the axial displacement of the transmission-side angled plate, the transmission side centrifugal mass having the aperture such that at least one device fixed to the input component has the arm which engages into the aperture to guide the radial displacement of the transmission-side centrifugal mass.

14. The method as claimed in claim 12, further comprising forming at least one of the engine-side and transmission side centrifugal masses by non-cutting methods.

15. The method as claimed in claim 14, wherein the non-cutting methods include forging, punching or stamping.

16. A centrifugal clutch for a drivetrain of a motor vehicle comprising:
    an input component for an introduction of torque;
    an output component for an onward transfer of torque;
    a switchable friction unit arranged between the input component and the output component, the switchable friction unit connecting the input component to the output component in torque-transmitting fashion by frictional engagement;
    a first centrifugal mass for actuating the switchable friction unit;
    a first angled plate axially between the first centrifugal mass and the output component, the first centrifugal mass being arranged with respect to the first angled plate such that a radial displacement of the first centrifugal mass forces an axial displacement of the first angled plate; and
    a first arm fixed to the input component, the first centrifugal mass having a first aperture, the first arm being received in the first aperture and configured to restrict the radially outward displacement of the first centrifugal mass.

17. The centrifugal clutch as claimed in claim 16, further comprising:
    a second centrifugal mass for actuating the switchable friction unit, the second centrifugal mass being axially offset from the first centrifugal mass;
    a second angled plate axially between the second centrifugal mass and the output component, the second centrifugal mass being arranged with respect to the second angled plate such that a radial displacement of the second centrifugal mass forces an axial displacement of the second angled plate;
    a second arm fixed to the input component, the second centrifugal mass having a second aperture, the second arm being received in the second aperture and configured to restrict the radial displacement of the second centrifugal mass.

18. The centrifugal clutch as claimed in claim 16 further comprising additional first centrifugal masses, the first centrifugal mass and the additional first centrifugal masses being arranged in a shape of a circle in a same radial plane.

19. The centrifugal clutch as claimed in claim 16 wherein the first angled plate includes a first finger radially aligned with the first arm.

20. The centrifugal clutch as claimed in claim 19 wherein the first centrifugal mass includes a first slope arranged in the first aperture, the first finger contacting the first slope.

* * * * *